United States Patent
Lovell

[15] 3,648,748
[45] Mar. 14, 1972

[54] TIRE HAVING POLYURETHANE LAMINATE THEREON

[72] Inventor: John A. Lovell, Munroe Falls, Ohio

[73] Assignee: The Goodyear Tire & Rubber Company, Akron, Ohio

[22] Filed: Aug. 18, 1969

[21] Appl. No.: 850,997

[52] U.S. Cl. ............................. 152/353, 152/330, 156/97, 156/98, 156/110 A, 156/128, 161/190
[51] Int. Cl. .................................. B60c 13/00, B60c 21/06
[58] Field of Search .................... 152/357, 370, 330; 156/97, 156/98, 128, 110 A; 161/190

[56] References Cited

UNITED STATES PATENTS 3,190,338  6/1965  Wolfe ............................. 152/370 X
3,462,328  8/1969  Buckland ........................ 161/190 X Primary Examiner—Leland A. Sabastian
Attorney—F. W. Brunner and H. C. Young

[57] ABSTRACT

A tire and method of preparation which comprises a cured rubber tire having adhered thereto a laminate of a cured polyurethane comprising a cured reaction mixture prepared by reacting an organic polyisocyanate with a reactive hydrogen containing material having a molecular weight of from about 700 to about 5,000 and a hydroxyl functionality of greater than 2.0 up to about 3,0 selected from hydroxyl terminated polymers of the group consisting of polymers and copolymers of 1,3-diene hydrocarbons having 4 to 6 carbon atoms, copolymers of 1,3-diene hydrocarbons having 4 to 6 carbon atoms with styrene, acrylonitrile, ethyl acrylate and chlorosubstituted 1,3-diene hydrocarbons having 4 to 6 carbon atoms.

10 Claims, 3 Drawing Figures

PATENTED MAR 14 1972  3,648,748
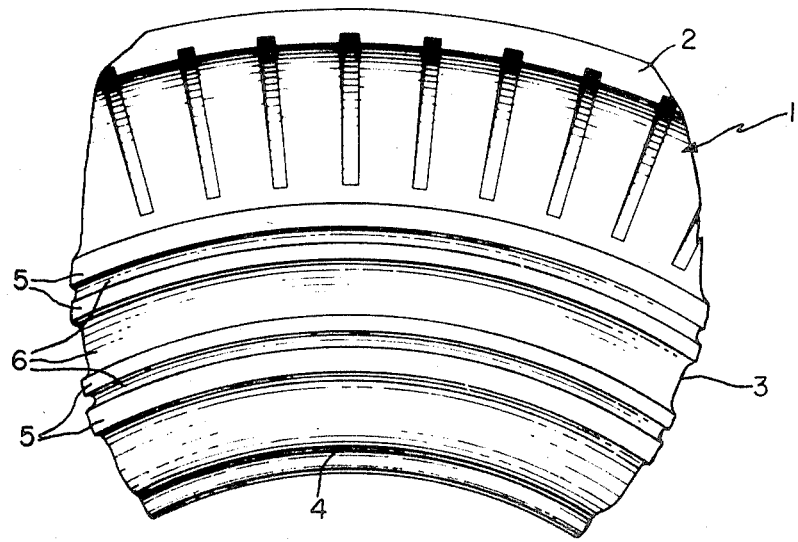
FIG. 1
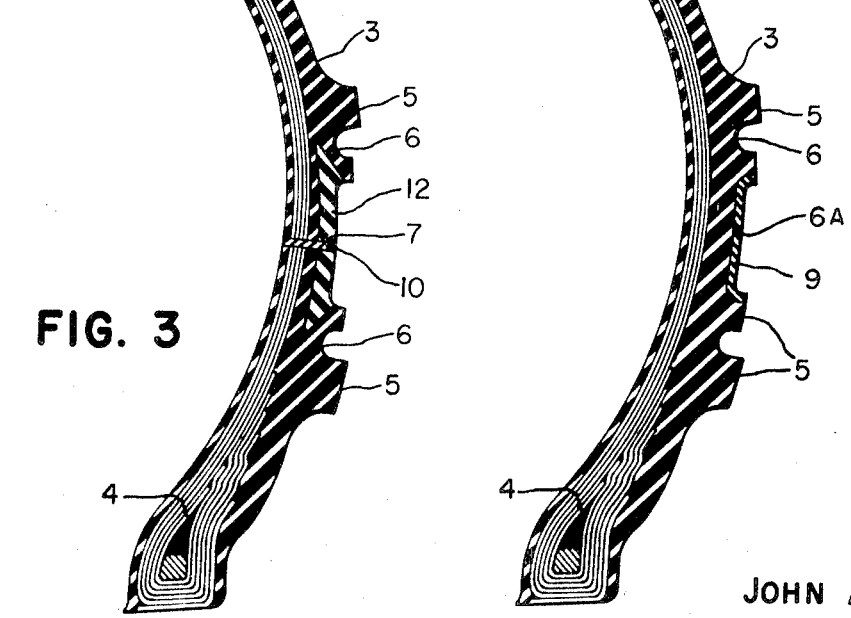
FIG. 2
FIG. 3
INVENTOR
JOHN A. LOVELL
Henry C. Young Jr.
ATTORNEY

3,648,748

TIRE HAVING POLYURETHANE LAMINATE THEREON

This invention relates to a tire having a laminate thereon and to a method of its preparation.

Heretofore, various methods have been employed to provide vehicular pneumatic and solid cured rubber tires having decorative, protective and identification laminates thereon. For example, such laminates have been prepared by coating portions of a cured rubber tire with various plastics and paints, including polyurethanes. Gouges and punctures in cured rubber tires have been repaired by forming laminates such as by plugging the gouge or hole with uncured rubber and curing it in place by coating with various plastics, rubbers and paints including polyurethanes and by cementing a cured plug of rubber in place. However, repair of punctured or gouged light colored portions of rubber tires, such as white sidewalls, typically results in commercially undesirable blemishes in the portion around the repair.

However, serious difficulties have been encountered in forming such laminates with good adhesion to the cured rubber tire, particularly with polyurethanes, without first modifying the cured rubber surface by chemical treatment. Even after such treatment, application of an adhesive to the cured rubber is typically required. For example, typically the cured rubber tire surface is first required to be cleaned with a solvent for removing oils and the like from its surface and then the rubber itself is required to be modified by chemical treatment such as with dilute hydrochloric acid or chlorine water. The treatment is typically followed with the application of an adhesive.

Therefore, it is an object of this invention to provide a cured rubber tire having an adherent laminate thereon which can be prepared without chemically treating its cured rubber surface and which can provide a decorative, protective or identification surface for the tire.

In accordance with this invention, a tire comprises a cured rubber tire having adhered thereto a laminate of a cured polyurethane comprising a cured reaction mixture prepared by reacting an organic polyisocyanate with a reactive hydrogen containing polymeric material having a molecular weight of from about 700 to about 5,000 and a hydroxyl functionality of greater than 2.0 up to about 3.0 selected from hydroxyl terminated polymers of the group consisting of polymers and copolymers of 1,3-diene hydrocarbons having 4 to 6 carbon atoms, copolymers of 1,3-diene hydrocarbons having 4 to 6 carbon atoms with styrene, acrylonitrile, ethyl acrylate and chloro substituted 1,3-diene hydrocarbons having 4 to 6 carbon atoms. The tire is prepared by the method which comprises (A) cleaning a portion of the surface of a cured rubber tire to be coated with a solvent, (B) coating the said surface with the liquid polyurethane reaction mixture and (C) curing the said reaction mixture to form a composite structure.

Further objects and advantages of this invention will be apparent by reference to the accompanying drawings in which:

FIG. 1 is a side elevational view and;

FIGS. 2 and 3 are partial cross-sectional views of black treaded cured rubber tires with FIGS. 2 and 3 having adherent cured polyurethane laminates.

Referring to the drawings, the cured rubber tire 1 comprises the usual tread portion 2, sidewall 3 and bead portion 4. The sidewall can comprise a plurality of ribs 5 and recessed portions 6 extending circumferentially around the sidewall.

In this invention, at least one of the recessed portions or grooves 6A or punctures or gouges, 7 and 8 in the cured vehicular tire is cleaned by washing with a mineral spirits solvent at about 25° C. and then dried. One of the punctures 7 is in white sidewall 12 and puncture 8 is in a black tread portion. Without further treatment of the groove 6A or punctures 7 and 8, their surfaces are coated with a liquid polyurethane reaction mixture 9, 10 and 11 at about 25° C. and the mixture cured for up to about 16 hours at 25° C. to form adherent laminates including adherent sealing plugs 10 and 11 for the punctures 7 and 8. In particular, the reaction mixture used for the puncture 7 is colored white with titanium dioxide and cured to form an adherent white polyurethane plug 10 matching the white color of the white sidewall without blemishes around its outer portion, mixture 9 being colored white and 11 black.

In the practice of this invention, the cured rubber tire can be various cured rubbers, such as natural rubber and synthetic rubbers. For example, they could be rubbery butadiene-styrene copolymers, butadiene-acrylonitrile copolymers, polyisoprene, polybutadiene, isoprene-butadiene copolymers, butyl rubber, ethylene-propylene copolymers, and ethylene-propylene terpolymers. Typically the various polymers are cured by normal curing methods and recipes such as with sulfur or with peroxides, in the case of the ethylene-propylene copolymers.

It is preferred that the cured polyurethane laminate of this invention is loaded with fillers to enhance its physical properties. Thus, it is preferred that the cured polyurethane contains from about 5 to about 100 weight percent of typical particular rubber reinforcing fillers, such as carbon black, titanium dioxide, zinc oxide, calcium carbonate, filler clays, silicas and coloring pigments. The addition of the reinforcing fillers preferably provides a cured polyurethane having an ultimate tensile strength of from about 300 pounds per square inch (p.s.i.) to about 2000 p.s.i., measured on an Instron tester at a crosshead of 5 inches per minutes at 25° C. and with a corresponding ultimate elongation of from about 700 percent to about 250 percent at about 25° C. according to the generally accepted rubber testing methods. Thus, such a filler-reinforced cured polyurethane having a tensile strength of about 300 p.s.i. has an elongation in the range of about 700 percent and such a filler-reinforced cured polyurethane having a tensile strength of about 2,000 p.s.i. has an elongation in the vicinity of 250 percent. Therefore, the loaded cured polyurethane is preferred to have physical properties such as tensile strength and elongation similar to the cured rubber tire on which it is a laminate.

The cured polyurethanes of this invention are usually prepared by reacting the reactive hydrogen polymeric material with the organic polyisocyanate such that the ratio of isocyanato groups to the reactive hydrogen containing groups of the reactive hydrogen containing polymeric material is from about 1.31/1 to about 2/1, and preferably from about 1/1 to about 1.5/1. They are generally reacted at temperatures of from about 20° C. to about 150° C. The reactive hydrogens are supplied by the hydroxyl groups of the reactive hydrogen containing polymeric material.

The hydroxyl terminated reactive hydrogen polymeric materials used to prepare the polyurethanes are typically polymers of 1,3-butadiene, polymers of isoprene, their copolymers, copolymers of 1,3-butadiene and styrene, copolymers of 1,3-butadiene and acrylonitrile, copolymers of 1,3-butadiene and ethyl acrylate and copolymers of 1,3 -butadiene and chloro-1,3-butadiene. Particularly useful polymers are polybutadiene, polyisoprene and copolymers of butadiene-isoprene, butadiene-styrene, and butadiene-acrylonitrile.

It is generally preferred that the hydroxyl terminated polymers have a hydroxyl functionality of from about 2.1 to about 2.5. They typically have a viscosity at about 30° C. of from about 10 poise to about 150 poise and more generally from about 20 poise to about 100 poise.

If desired, a catalyst can be used to increase the reaction rate between the reactive hydrogen containing material and the polyisocyanate. Suitable catalysts are the well known catalysts typically used for polyurethanes. Representative of the various catalysts are dibutyltin dilaurate, stannous octoate, magnesium oxide, butyl aldehyde-butyl amine condensation product, 2-mercaptobenzothiazole, cobalt naphthenate and tertiary amines such as triethylene diamine, methylated tetraethylene tetramine and hexamethylene tetramine. It has been found that the organo tin compounds such as dibutyltin dilaurate and stannous octoate are quite useful in this regard.

It is an important feature of this invention that additional solvents are generally not needed to effect the adherent laminate. However, if desired, small amounts of nonreactive solvents can be used with the polyurethane reaction mixture, such as up to about 10 percent by weight of the solvent. Representative of the many suitable solvents are benzene, toluene, the paraffinic, naphthenic and aromatic naphthyls, liquid ketones such as acetone, methyl ethyl ketone, diethyl ketone, methyl isoamyl ketone, diisobutyl ketone, cellusolve acetate, dioxane and chlorinated hydrocarbons such as trichloroethylene, methylene chloride, etc. The addition of a solvent to the polyurethane reaction mixture can become desirable where its viscosity is required to be adjusted for spray applications.

Various aliphatic, alicyclic and aromatic organic polyisocyanates can be used to prepare the isocyanate-terminated polyurethanes. Representative examples include 1,6-hexamethylene diisocyanate, 1,10-decamethylene diisocyanate, 1,4-cyclohexylene diisocyanate, 4,4'-methylene-bis(cyclohexylisocyanate), 1,5-tetrahydronaphthalene diisocyanate, isophorone diisocyanate, the 2,4- and 2,6-toluene diisocyanates, m-phenylene diisocyanate, diphenylmethane-4,4'-diisocyanate, hydrogenated diphenylmethane-4,4'-diisocyanate, and 3,3'-dimenthyl-4,4-bis phenylene diisocyanate, as well as the polyalkylene-polyarylene isocyanates as more particularly referred to in U.S. Pat. No. 2,683,730.

It is a further important feature of this invention that the preparation of the cured rubber surface of the tire essentially need only be prepared by cleaning with a suitable solvent for the purposes of removing surface oils and the like. Any of the various solvents used for dissolving oils can be used which do not dissolve or swell the rubber surface. Representative of such solvents are mineral spirits, Stoddard solvent, liquid ketones such as acetone, methyl ethyl ketone, methyl isobutyl ketones, diisobutyl ketone, diethyl ketone, methyl isoamyl ketone, liquid alcohols such as methanol, ethanol, isopropanol and butanol, aromatic hydrocarbons such as benzene, toluene and xylene, aliphatic hydrocarbons such as pentane, hexane, heptane, neohexane (2,2-dimethylhexane) and dimethyl pentane and dimethyl formamide. The mineral spirits, sometimes known as petroleum spirits, is typically identified by ASTM test D 235–61 and the Stoddard solvent is typically identified by ASTM test D 484–52 as a specification for the solvent approved as a United States standard by the United States Standard Institute.

The discovery of this invention is particularly related to unexpectedly finding that useful adherent laminates on a cured rubber tire, and particularly, in the recessed portions of such a tire, can be formed from the specific types of polyurethane reaction mixtures disclosed herein. It even more particularly relates to the discovery that such laminates can be formed on the cured rubber tire without previously chemically treating the rubber, thereby only needing to clean its surface with a suitable solvent and, if desired, buffing the surface to roughen or abrade away a portion of the rubber.

Thus, the invention has particular utility for forming in the recesses portions of a cured tire identity markings and colored sidewalls having a color contrasting to the tire as well as repairs for gouges and punctures which require matching colors. The invention is, therefore, useful as an improved method of identification and also for preparing a pneumatic tire including a generally toroidal shaped carcass, spaced beads having rubber sidewalls and a rubber tread, at least one of the sidewalls having a plurality of circumferentially extending grooves and having an adherent layer of the cured polyurethane in at least one groove therein, said layer having a color contrasting to the tire. In one aspect of this invention, small colored metal or other chips or spangles can be disposed in the polyurethane reaction mixture to provide an adherent polyurethane layer in a recessed portion of the tire with colored spangles such as, for example, pieces of light reflective metal, disposed in the said polyurethane, to provide a decorative as well as a protective utility.

The following illustrative examples are set forth to further exemplify the objects and advantages of the invention. The parts and percentages are by weight unless otherwise indicated.

EXAMPLE I

A pneumatic black colored cured butadiene-styrene tire having a sidewall with circumferential grooves therein, similar to FIGS. 1 and 2 was prepared by first cleaning at least one of the said groove with mineral spirits at about 25° C. to remove surface oils and dried. The surface of the groove was then coated with the polyurethane reaction mixture and the said mixture cured at about 25° C. for about ½ hour. The cured polyurethane coating resulted in an adherent protective and decorative white circumferential laminate in the black colored sidewall of the tire.

For this example, the white polyurethane reaction mixture was prepared by the following method:

To 100 parts of a hydroxyl terminated polybutadiene having a viscosity of about 50 poise at 30° C. and a hydroxyl functionality of about 2.1 (obtainable as R-45M poly B-D resin from the Arco Chemical Company, division of the Atlantic Richfield Company), was mixed 70 parts of a mixture of titanium dioxide, zinc oxide, and calcium carbonate as a reinforcing and coloring filler. To this mixture was then added 0.1 parts of dibutyltin laurate. To the resulting mixture was then mixed 9.2 parts of hydrogenated diphenylmethane-4,4'-diisocyanate (obtained as Hylene-W from the DuPont de Nemours Company) at about 25° C.

A sample of the resulting cured polyurethane had an ultimate tensile strength of about 850 pounds per square inch and an ultimate elongation of about 325 percent at about 25° C.

EXAMPLE II

A pneumatic cured butadiene-styrene tire having a puncture in its tread portion similar to FIG. 3 was prepared by first cleaning the puncture with mineral spirits at about 25° C. to remove surface oils and any foreign matter present and dried. The puncture was then filled with a polyurethane reaction mixture and cured at about 25° C. for about an hour to form an adherent protective laminate repair in the tire tread.

The polyurethane reaction mixture used was prepared according to the method of Example I except that the reinforcing pigment was carbon black.

EXAMPLE III

A pneumatic cured butadiene-styrene tire having a punctured white sidewall similar to FIG. 3 was prepared by first cleaning the puncture with mineral spirits to remove surface oils and any excess foreign matter therefrom and dried. The puncture was then filled with a polyurethane reaction mixture colored white with titanium dioxide, where the amount of titanium dioxide in the said mixture was adjusted to provide a color matching the white sidewall and cured at about 25° C. for about an hour. The polyurethane filled puncture of the white sidewall exhibited essentially no blemishes around the repair and thus, the decorative white sidewall was essentially restored to its original gloss. The polyurethane reaction mixture used was prepared according to the method of Example I.

Thus, it is shown in these examples that the method of this invention can be used for forming various laminates on a cured rubber tire such as the formation of adherent colored sidewalls, the repair of colored sidewalls and, in particular, the repair of gouged rubber tires. In the practice of this invention it is an important feature that the cured polyurethane is reinforced with a sufficient amount of rubber reinforcing fillers to provide a cured polyurethane having an ultimate tensile strength of from about 300 p.s.i. to about 2,000 p.s.i. with a corresponding ultimate elongation of from about 700 to about 250 percent at about 25° C.

While certain representative embodiments and details have been shown for the purpose of illustrating the invention, it will be apparent to those skilled in this art that various changes and modifications may be made therein without departing from the spirit or scope of the invention.

What is claimed is:

1. A tire which comprises a cured rubber tire having adhered thereto a laminate of a cured polyurethane comprising a cured reaction mixture prepared by reacting an organic polyisocyanate with a reactive hydrogen containing material having a molecular weight of from about 700 to about 5,000 and a hydroxyl functionality of greater than 2.0 up to about 3.0 selected from hydroxyl terminated polymers of the group consisting of polymers of the group consisting of polymers and copolymers of 1,3-diene hydrocarbons having 4 to 6 carbon atoms, copolymers of 1,3-diene hydrocarbons having 4 to 6 carbon atoms with styrene, acrylonitrile, ethyl acrylate and chlorosubstituted 1,3-diene hydrocarbons having 4 to 6 carbon atoms where the cured polyurethane is reinforced with from about 5 to about 100 weight percent of rubber reinforcing fillers sufficient to provide a cured polyurethane having an ultimate tensile strength of from about 300 p.s.i. to about 2,000 p.s.i. with a corresponding ultimate elongation of from about 700 to about 250 percent at about 25° C. and where the cured rubber tire is prepared from rubbers selected from natural rubber, and synthetic rubbers selected from butadiene-styrene copolymers, butadiene-acrylonitrile copolymers, polyisoprene, polybutadiene, isoprene-butadiene copolymers, butyl rubber, ethylene-propylene copolymers, and ethylene-propylene terpolymers.

2. The tire according to claim 1 where the polyisocyanate used to prepare the polyurethanes is an organic diisocyanate and hydroxyl terminated reactive hydrogen polymeric materials have a hydroxyl functionality of from about 2.1 to about 2.5 and a viscosity at about 30° C. of from about 10 poise to about 150 poise selected from hydroxyl terminated polymers of 1,3-butadiene, isoprene, copolymers of 1,3-butadiene and isoprene copolymers of 1,3-butadiene and styrene, copolymers of 1,3-butadiene and acrylonitrile, copolymers of 1,3-butadiene and ethyl acrylate and copolymers of 1,3-butadiene and chloro 1,3-butadiene, where the ratio of the isocyanato groups of the diisocyanate to the reactive hydrogen containing groups of the reactive hydrogen containing polymeric material is from about 1/1 to about 2/1 and where the said diisocyanate and polymeric material are reacted at a temperature of from about 20° to about 150° C.

3. A pneumatic tire according to claim 2 including a generally toroidal shaped carcass, spaced beads having rubber sidewalls and a rubber tread, at least one of the sidewalls having a plurality of circumferentially extending grooves and having an adherent layer of the cured polyurethane in at least one groove therein, said layer having a color contrasting to the tire.

4. The tire according to claim 1 where the rubber reinforcing fillers are selected from carbon black, titanium dioxide, zinc oxide, calcium carbonate, filler clays, silicas and coloring pigments and where the organic polyisocyanates are selected from 1,6-hexamethylene diisocyanate, 1,10-decamethylene diisocyanate, 1,4-cyclohexylene diisocyanate, 4,4'-methylene-bis(cyclohexylisocyanate) and 1,5-tetrahydronaphthalene diisocyanate, isophorone diisocyanate, the 2,4- and 2,6-toluene diisocyanates, m-phenylene diisocyanate, diphenylmethane-4,4'-diisocyanate, hydrogenated diphenylmethane-4,4'-diisocyanate, 3,3'-dimethyl-4,4'-bis phenylene diisocyanate and polyalkylene-polyarylene isocyanates.

5. The tire according to claim 1 wherein said cured reinforced polyurethane laminate is adhered to the tire sidewall.

6. A method of preparing the tire according to claim 1 which comprises (A) cleaning a portion of the surface of the cured rubber tire to be coated with a solvent, (B) coating the said surface with the liquid polyurethane reaction mixture and (C) curing the said reaction mixture to form a composite structure.

7. The method according to claim 6 where the cured polyurethane is reinforced with from about 5 to about 100 weight percent of rubber reinforcing fillers sufficient to provide a cured polyurethane having an ultimate tensile strength of from about 300 p.s.i. to about 2,000 p.s.i. with a corresponding ultimate elongation of from about 700 to about 250 percent at about 25° C.

8. The method according to claim 7 where the cured rubber tire is prepared from rubbers selected from natural rubber, and synthetic rubbers selected from butadiene-styrene copolymers, butadiene-acrylonitrile copolymers, polyisoprene, polybutadiene, isoprene-butadiene copolymers, butyl rubber, ethylene-propylene copolymers, and ethylene propylene terpolymers.

9. The method according to claim 8 where the polyisocyanate used to prepare the polyurethanes is an organic diisocyanate and hydroxyl terminated reactive hydrogen polymeric materials have a hydroxyl functionality of from about 2.1 to about 2.5 and a viscosity at about 30° C. of from about 10 poise to about 150 poise selected from hydroxyl terminated polymers of 1,3-butadiene, isoprene, copolymers of 1,3-butadiene and isoprene copolymers of 1,3-butadiene and styrene, copolymers of 1,3-butadiene and acrylonitrile, copolymers of 1,3-butadiene and ethyl acrylate and copolymers of 1,3-butadiene and chloro 1,3-butadiene, where the ratio of the isocyanato groups of the diisocyante to the reactive hydrogen containing groups of the reactive hydrogen containing polymeric material is from about 1/1 to about 2/1 and where the said diisocyanate and polymeric material are reacted at a temperature of from about 20° to about 150° C.

10. The method according to claim 6 of repairing a gouged cured rubber tire.

* * * * *